United States Patent [19]

Schaefer et al.

[11] Patent Number: 5,208,311

[45] Date of Patent: May 4, 1993

[54] ORGANOPOLYSILOXANES WITH POLYETHER AND ESTER GROUPS LINKED TO A COMMON SPACER GROUP

[75] Inventors: Dietmar Schaefer, Hattingen; Andreas Weier, Essen; Dietmar Wewers, Bottrop, all of Fed. Rep. of Germany

[73] Assignee: Th. Goldschmidt AG, Essen, Fed. Rep. of Germany

[21] Appl. No.: 825,393

[22] Filed: Jan. 24, 1992

[30] Foreign Application Priority Data

Feb. 13, 1991 [DE] Fed. Rep. of Germany ....... 4104270

[51] Int. Cl.$^5$ .............................................. C08G 77/08
[52] U.S. Cl. ....................................... 528/13; 528/25; 528/29; 528/41; 528/32; 525/474; 525/479; 522/99
[58] Field of Search ....................... 528/13, 25, 29, 41, 528/32; 525/474, 479; 522/99

[56] References Cited

U.S. PATENT DOCUMENTS

| | | | |
|---|---|---|---|
| 4,431,789 | 2/1984 | Okazaki et al. | 528/15 |
| 4,663,185 | 5/1987 | Eckberg | 427/54.1 |
| 4,906,718 | 3/1990 | Gornowicz et al. | 528/15 |
| 4,963,438 | 10/1990 | Weitemeyer et al. | 428/447 |
| 4,978,726 | 12/1990 | Döhler et al. | 525/479 |
| 5,075,403 | 12/1991 | Kirk | 528/15 |

*Primary Examiner*—John C. Bleutge
*Assistant Examiner*—Margaret W. Glass
*Attorney, Agent, or Firm*—Anderson Kill Olick & Oshinsky

[57] ABSTRACT

Organopolysiloxanes having polyether and ester groups linked to a common spacer group, wherein the spacer group is linked through an SiC bond to the siloxane backbone and a method for the synthesis thereof are disclosed. These compounds are useful as additives for plastics, lacquers and binders for reducing the coefficient of sliding friction, for improving scratch resistance and increasing abhesiveness. If the compounds are esters of acrylic or methacrylic acid, they can be used as radiation-curable lacquers and coating compositions.

14 Claims, No Drawings

ORGANOPOLYSILOXANES WITH POLYETHER AND ESTER GROUPS LINKED TO A COMMON SPACER GROUP

BACKGROUND OF INVENTION

This invention relates to organopolysiloxanes with polyether and ester groups linked to a common spacer group, wherein the spacer group is linked through an SiC bond to the siloxane backbone.

It is well known that polysiloxanes which contain polyether groups that are linked to the polysiloxane backbone by an SiC bond are synthesized by the addition reaction between allyl polyethers and hydrogensiloxanes. Reference is made only to the German Patent 31 33 869 as being representative of the patent literature which deals with this synthesis.

However, it has proven to be disconcerting that, under the conditions of the hydrosilylation, a rearrangement of the allyl polyether to the corresponding propylene polyether takes place in competition with the addition reaction:

$$CH_2=CH-CH_2-O-[C_nH_{2n}O-]_m \rightarrow Ch_3-CH=CH-O[C_nH_{2n}O-]_m$$

These propylene ethers do not participate in the hydrosilylation reaction and, because they cannot be separated economically from the polyethersiloxane obtained, for example, by distillation, they remain in considerable amounts in the hydrosilylation product. When the polyether siloxanes are used, the propenyl ethers can interfere and lead to detrimental effects. However, a method which can prevent this rearrangement or, at least, largely suppress it is not yet known.

The use of polysiloxanes with (meth)acrylate ester groups linked over SiC groups as radiation curable coating agents is known from the German Patent 38 10 140.

These compounds can be obtained by reacting polysiloxanes of the general average formula

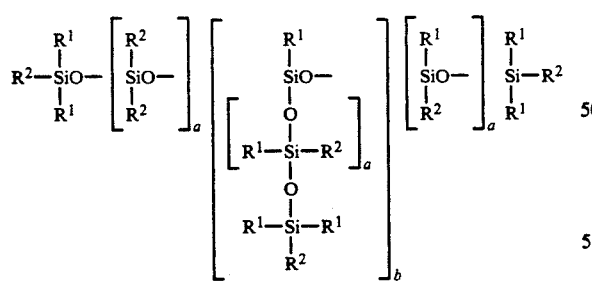

wherein

R$^1$ groups are the same or different and in each case represent low molecular weight alkyl groups with 1 to 4 carbon atoms or phenyl groups, R$^2$ groups partly can have the meaning of the R$^1$ groups and R$^2$ groups remaining, to the extent of 70 to 100%, are hydroxy-functional groups of the formula
—CH$_2$(CR$^3{}_2$)$_n$—(OCH$_2$CHR$^4$)$_m$—OH, —CH=CH—CR$^3{}_2$—OH or

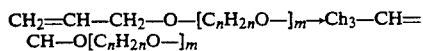

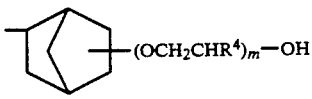

wherein

R$^3$ groups are the same or different and in each case represent an H group or an alkyl group with 1 to 4 carbon atoms, R$^4$ groups are the same or different and in each case represent an H group of an alkyl group with 1 to 10 carbon atoms, and the subscripts n=0 to 10 and m=0 to 40, and to the extent of 30 to 0%, are optionally substituted alkyl groups with 2 to 20 carbon atoms and/or hydrogen groups, with the proviso that at least 1.8 hydroxy-functional groups are contained in the average molecule, a has a value of 1 to 1000 and b has a value of 0 to 10, with 0.4 to 0.9 molar amount of (meth)acrylic acid and up to 0.6 molar amount of a monocarboxylic acid which is free of double bonds capable of polymerizing based on the hydroxyl groups, with the proviso that the sum of the molar amount of acid does not exceed 1.0, under the usual esterification conditions.

Also with this method, there is risk that the double bond of the α-unsaturated, ω-OH component will isomerize in the course of the platinum-catalyzed addition reaction to the hydrogen siloxane. While thus formed propenyl alcohol which rearranges to the propionaldehyde can be distilled off from the addition reaction product, the propenyl polyether remains in the product. Since the propenyl polyether is not silicone-modified, it can adversely affect the abhesiveness of the product.

German patent 38 20 294 is an example of the state of the art for polysiloxanes which have ester groups at a spacer group linked by an SiC bond. This patent relates to polysiloxanes with (meth)acrylate ester groups linked through SiC groups. They can be obtained by reacting polysiloxanes of the general, average formula

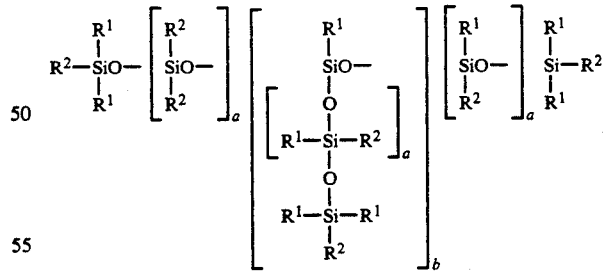

wherein

R$^1$ groups are the same or different and in each case represent low molecular weight alkyl groups with 1 to 4 carbon atoms or phenyl groups R$^2$ groups partially have the meaning of the R$^1$ groups and the R$^2$ groups remaining to the extent of 70 to 100% are conventional epoxy-functional groups and to the extent of 30 to 0% are alkyl groups with 2 to 10 carbon atoms or hydrogen groups, with the proviso that at least 1.8 epoxy groups are
contained in the average molecule
a has a value of 1 to 1,000 and
b has a value of 0 to 10,
with 0.4 to 0.9 molar amount of (meth)acrylic acid
based on the epoxy groups, and reacting remaining
epoxide groups with a monocarboxylic acid with 2 to 12
carbon atoms which is free of double bonds that are
capable of polymerizing.

OBJECTS OF THE INVENTION

An object of the invention is to provide novel organopolysiloxanes with polyether and ester groups linked to a common spacer group, wherein the spacer group is linked to the siloxane backbone through an SiC bond and the organopolysiloxanes are free of propenyl ethers.

Another object of the invention is to provide a method for obtaining such novel organopolysiloxanes in an economic manner.

A further object of the invention is to provide useful organopolysiloxanes additives for synthetic materials, such as lacquers and binders.

Still another object of the invention is to provide lacquers, binders and coatings containing organopolysiloxanes additives which endow these compositions with advantageous properties.

These and other objects will be apparent from the disclosure below.

Novel, advantageous organopolysiloxanes with polyether and ester groups linked to a common spacer group, wherein the spacer group is linked to the siloxane backbone through an SiC bond have been discovered which have the general formula

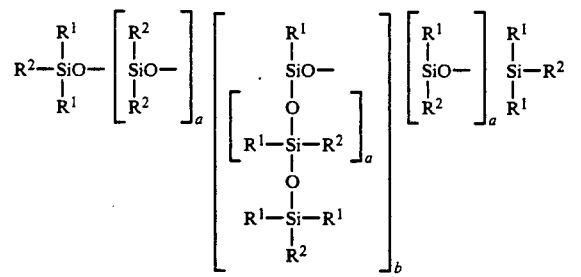

wherein
$R^1$ groups are the same or different and in each case represent alkyl groups with 1 to 4 carbon atoms or phenyl groups, with the proviso that at least 90% of the $R^1$ groups are methyl groups,
$R^2$ groups partially can have the meaning of the $R1^1$ groups,
$R^2$ groups remaining to the extent of
70 to 100% are groups of the formula $R^3$—$R^4$, in which
$R^3$ is a divalent hydrocarbon group, the carbon chain of which can be interrupted by an oxygen atom and/or which can have a carbonyl group and
$R^4$ is the

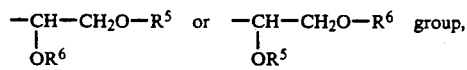

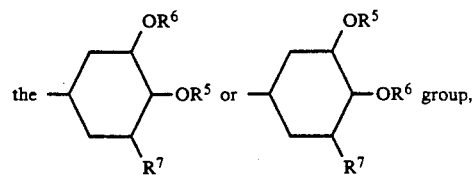

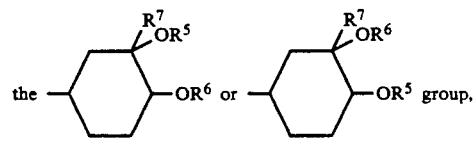

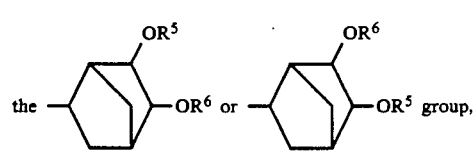

in which
$R^5$ is the acyl group of a monocarboxylic acid with 1 to 20 carbon atoms,
$R^6$ is a polyether group and
$R^7$ is hydrogen or methyl group and 0 to 30% of the remaining $R_2$ groups are alkyl groups with 2 to 30 carbon atoms and/or hydrogen groups,
a has a value of 1 to 1,000 and
b has a value of 0 to 10,
with the proviso that in the average molecule, at least one $R^2$ group is a group having the formula $R^3$—$R^4$.

According to the invention, the novel, advantageous organopolysiloxanes are synthesized by carrying out an addition reaction, which will be described in detail below, of particular organopolysiloxanes with alkylene oxides having 2 to 4 carbon atoms.

DESCRIPTION OF THE INVENTION $R^1$ groups of the novel organopolysiloxanes of the invention are in each case low molecular weight alkyl groups with 1 to 4 carbon atoms or phenyl groups. The alkyl groups can be linear or, in the event that there are more than 2 carbon atoms in the group, also branched. Linear alkyl groups, particularly methyl groups, are preferred. The condition must be fulfilled that at least 90% of the $R^1$ groups are methyl groups.

$R^2$ groups may be partially identical with the $R^1$ groups. However, the condition must be fulfilled that, in the average molecule of organopolysiloxane, at least one $R^2$ group represents a group having the formula $R^3$—$R^4$.

$R^3$ is a divalent hydrocarbon group, the hydrocarbon chain of which can be interrupted by an oxygen atom, and/or which has a carbonyl group. Preferably, the $R^3$ groups are selected from the group comprising:

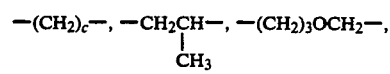

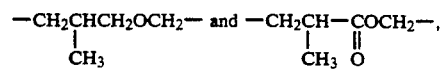

in which c is a number from 1 to 6.
Further examples of $R^3$ groups are

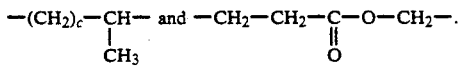

R⁴ groups are selected from the following groups

 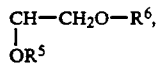

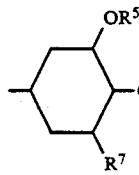 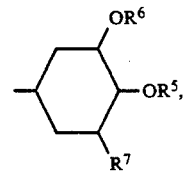

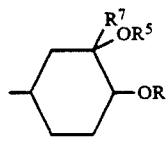 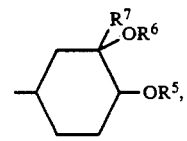

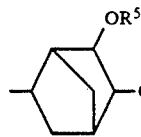 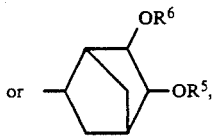

wherein $R^5$, $R^6$ and $R^7$ have the following meaning.

$R^5$ is an acyl group of a monocarboxylic acid with 1 to 20 carbon atoms. The monocarboxylic acids preferably are aliphatic, saturated or unsaturated acids. Examples of such monocarboxylic acids are acetic acid, propionic acid, ethylhexanoic acid, lauric acid, stearic acid, acrylic acid, methacrylic acid and oleic acid. If $R^5$ is the acyl group of acrylic or methacrylic acid, products are obtained which can be cured by the action of high energy radiation.

$R^6$ is a polyether group. Preferably, it corresponds to the general formula $-(C_nH_{2n}O-)_mH$, wherein n has an average value of 2.0 to 4.0 and m has an average value of 2 to 100. The polyether group can have oxyethylene, oxypropylene and/or oxybutylene units, which are disposed in block or random distribution. Preferably, n has an average value of 2.0 to 3.0. The polyether group can, however, also consist of or contain those units, which are obtained by the addition reaction of epoxides, such as allyl glycidyl ether, 9-epoxydecene or vinylcyclohexene oxide.

$R^7$ is a hydrogen or methyl group, the hydrogen group being preferred.

Finally, $R^2$ can also be an alkyl group with 2 to 30 carbon atoms and/or a hydrogen group.

The ratio of $R^3$—$R^4$ groups to alkyl groups with 2 to 12 carbon atoms or to hydrogen groups is the following: 70 to 100% of the $R^2$ groups which do not have the meaning of the $R^1$ group are $R^3$—$R^4$ groups and 0 to 30% of the $R^2$ groups which do not have the meaning of the $R^1$ group are alkyl groups with 2 to 12 carbon atoms or hydrogen groups.

The lower limit for the content of $R^3$—$R^4$ groups is given by the condition that at least one $R^2$ group in the average molecule is an $R^3$—$R^4$ group. The upper limit for the content of $R^3$—$R^4$ groups is given by the condition that all $R^2$ groups are $R^3$—$R^4$ groups.

Due to the reaction, the inventive compounds may contain epoxide groups to a minor extent, since these groups are the precursors of the $R^4$ group:

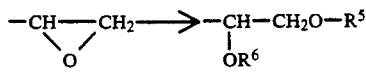

However, the number of epoxide groups in the average molecule should be less than 1, in order to exclude interfering side reactions, such as gelling.

The number of difunctional siloxy units is fixed by the subscript a. In the case of linear molecules, the number of difunctional siloxy units is given by $2a$. In the case of branched siloxanes, the number of difunctional siloxy units is $2a+b\times a$. In this connection a has a value of 1 to 1,000 and preferably of 3 to 200.

The number of trifunctional siloxy units is given by the subscript b. In the average molecule, the value of b is 0 to 10 and preferably 0 to 2.

A method for the synthesis of organopolysiloxanes according to the invention comprises subjecting an organopolysiloxane of the following general formula to an addition reaction with alkylene oxide

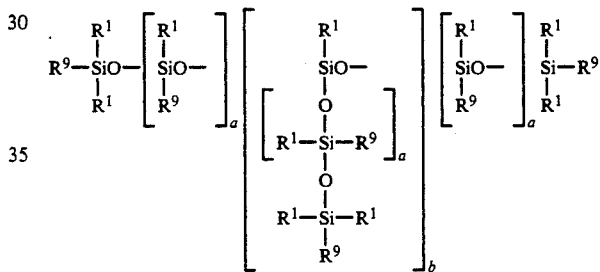

wherein the $R^1$ groups and the subscripts a and b have the meanings already given and $R^9$ groups partly can have the meaning of the $R^1$ groups and $R^9$ groups remaining to the extent of 70 to 100% are groups of the formula $R^3$—$R^{10}$, in which $R^3$ has the meaning already given and $R^{10}$ represents one of the following groups:

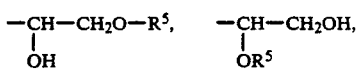

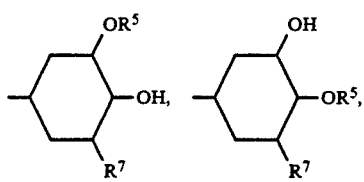

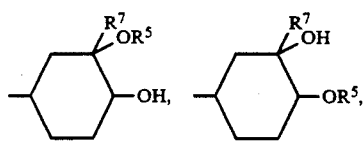

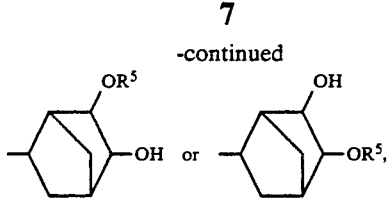

in which $R^5$ and $R^7$ have the meanings already given, and 0 to 30% of remaining $R^9$ groups are alkyl groups with 2 to 30 carbon atoms and/or hydrogen groups, with the proviso that at least one $R^2$ group in the average molecule is a group of the formula $R^3$—$R^{10}$, and wherein, the addition reaction takes place with 2 to 100 moles of alkylene oxide with 2 to 4 carbon atoms individually or in admixture, based on the $R^3$—$R^{10}$ groups, in the presence of an acidic catalyst or complex catalyst which accelerates the addition reaction between alkylene oxide and hydroxyl groups, optionally in the presence of a solvent.

In the event that different alkylene oxides are used, the addition reaction with the alkylene oxides can take place either consecutively, so that blocks of the individual oxyalkylene units are formed, or in the form of an alkylene oxide mixture, in which case products with a random distribution of the different oxyalkylene units are obtained. Preferably, ethylene oxide and/or propylene oxide are used as alkylene oxides.

As catalysts for the addition reaction of alkylene oxides, acidic catalysts or complex catalysts are used. Examples of suitable acidic catalysts are $BF_3$, $AlCl_3$ or $SnCl_4$. Examples of complex catalysts are $Zn_3[Co(CN)_6]_2$, $Pt\text{-}Me_2(1,10\text{-phenanthroline})$ and zinc N-methyltetraphenylporphyrin isopropanolate.

$BF_3$ is particularly preferred as catalyst. If $BF_3$ is used, the addition reaction of the alkylene oxides takes place at temperatures of $\leq 60°$ C., preferably at $0°$ to $50°$ C. and particularly at $20°$ to $40°$ C.

When complex catalysts are used, higher temperatures, particularly temperatures of $80°$ to $160°$ C., can be used.

According to the state of the art, siloxanes with polyoxyalkylene blocks are synthesized by reacting the polysiloxane with polyoxyalkylene monools or their reactive derivatives. It was highly surprising that side reactions, particularly degradation and/or equilibration reactions involving the backbone of the siloxane were not observed to an interfering extent, when the method of the invention was carried out in the presence of the aforementioned catalysts.

It has also been found that the organopolysiloxanes are very useful additives for synthetic materials, lacquers and binders. They can be added to synthetic materials, such as polyurethane acrylates, polyether acrylates and polystyrenes and bring about, just as they do when they are added to lacquers and binders, low coefficients of sliding frictions, higher scratch resistance and an increase in the abhesiveness.

If $R^5$ in the inventive compounds is the acyl group of acrylic or methacrylic acid, the compounds can be used as lacquers or coating compositions which are cured by radiation, or as additives in such systems. They can be compounded in the conventional manner with curing initiators, fillers, pigments and other, common additives. The compounds are cured under the action of high-energy radiation, such as UV or electron beams, within a very short time to mechanically and chemically resistant layers, which, if the composition of the inventive compounds is suitable, can have predetermined abhesive properties.

The following examples further illustrate the new organopolysiloxanes of the invention, as well as their synthesis and useful properties. However, the illustrative examples must not be considered as limiting the invention in any manner.

EXAMPLE 1

To a mixture of 124.6 g (0.1 mole) of a siloxane containing hydroxy groups of the following average formula I

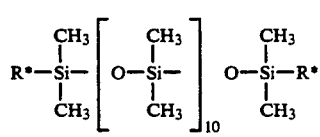

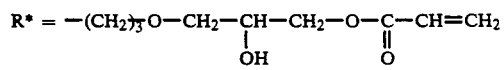

or

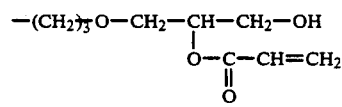

and 20 ml of toluene, 0.5 ml (1 mole percent, based on the OH groups) of boron trifluoride are added as a 48% solution in diethyl ether. After that, 46.4 g (0.8 moles) of propylene oxide are slowly added dropwise, so that the temperature of the reaction mixture does not exceed 60° C. At the end of the addition, stirring is continued for a further ¼ hour, after which the reaction mixture is neutralized with water and sodium hydrogen carbonate. After filtration and drawing off the volatile reaction products at 120° C. and 13.3 Pa, 159 g (93% of the theoretical yield) of a moderately viscous oil of formula I (according to the spectroscopic data) with

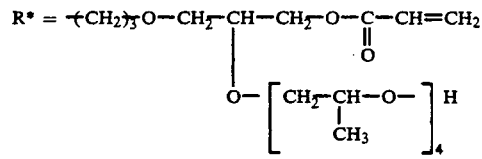

or

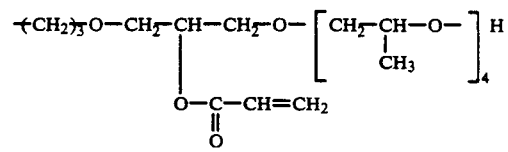

EXAMPLE 2

To a mixture of 126 g (0.1 moles) of a siloxane containing hydroxy groups of average formula I wherein

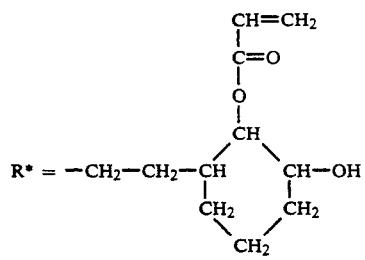

or

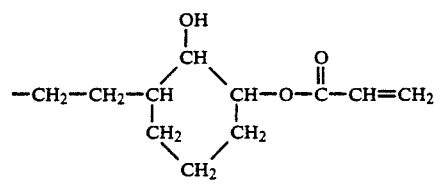

and 20 ml of toluene, 0.5 ml (1 mole percent, based on the OH groups) of boron trifluoride solution are added as a 48% solution in diethyl ether. After that, 46.4 g (0.8 moles) of propylene oxide are slowly added dropwise, so that the temperature of the reaction mixture does not exceed 60° C. At the end of the addition, stirring is continued for a further ½ hour, after which the reaction is neutralized with water and sodium hydrogen carbonate. After filtration and drawing off the volatile reaction products at 120° C. and 13.3 Pa, 157 g (91% of the theoretical yield) of a moderately viscous oil of formula I (according to the spectroscopic data) are obtained wherein

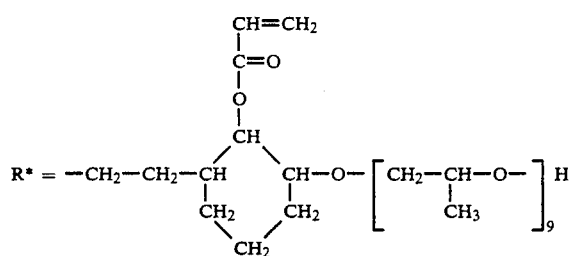

or

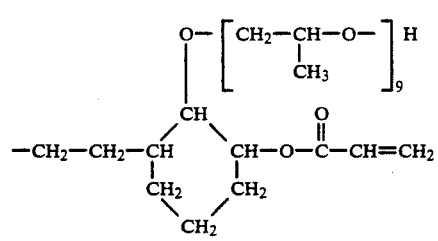

EXAMPLE 3

To a mixture of 223.1 g (0.05 moles) of a siloxane containing hydroxy groups of the average formula II

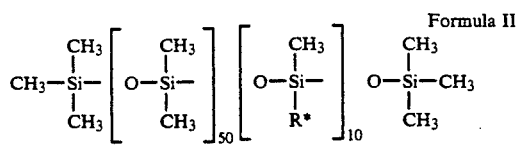

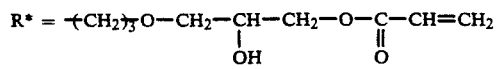

or

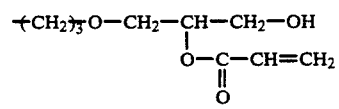

and 50 ml of toluene, 2.5 ml (1 mole percent, based on the OH groups) of boron trifluoride is added as a 48% solution in diethyl ether. Ethylene oxide (264 g, 6 moles) is then added slowly in a pressure vessel, so that the temperature of the reaction mixture does not exceed 40° C. At the end of the addition, the stirring is continued for a further ½ hour, after which the reaction mixture is neutralized with water and sodium hydrogen carbonate. After filtration and drawing off the volatile reaction products at 120° C. and 13.3 Pa, 438 g (90% of the theoretical yield) of a moderately viscous oil of formula I (according to spectroscopic data) is obtained wherein

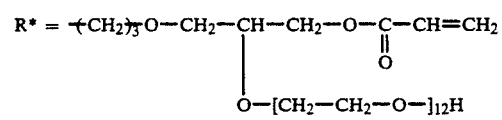

or

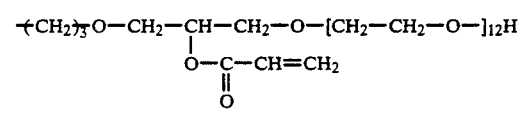

EXAMPLE 4

To a mixture of 124.6 g (0.1 moles) of a siloxane containing hydroxy groups of average formula I,

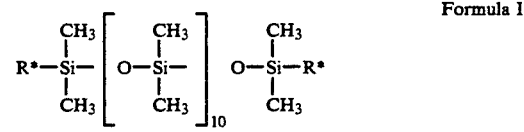

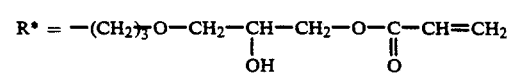

or

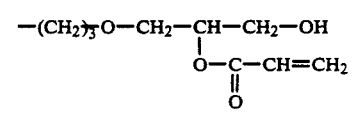

and 20 ml of toluene, 0.5 ml (1 mole percent, based on the OH groups) of boron trifluoride are added as a 48% solution in diethyl ether. Ethylene oxide (105.6 g, 2.4 moles) is then added slowly in a pressure vessel, so that the temperature of the reaction mixture does not exceed 60° C. At the end of the addition, stirring is continued for a further ½ hour, after which the reaction mixture is neutralized with water and sodium hydrogen carbonate. After filtration and drawing off the volatile reaction products at 120° C. and 13.3 Pa, 218 g (95% of the theoretical yield) of a moderately viscous oil of formula I (according to spectroscopic data) are obtained wherein

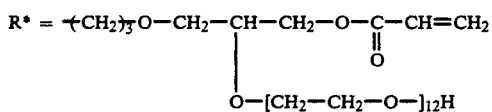

or

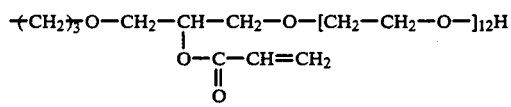

EXAMPLE 5

To a mixture of 124.6 g (0.1 moles) of a siloxane containing hydroxy groups of average formula I, containing -continued

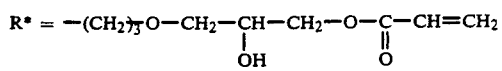

or

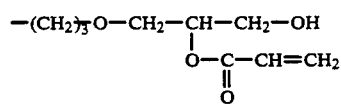

and 20 ml of toluene, 0.5 ml (1 mole percent, based on the OH groups) of boron trifluoride are added as a 48% solution in diethyl ether. Ethylene oxide 35.2 g, (0.8 moles) and 46.6 g (0.8 moles) of propylene oxide are then added slowly in a pressure vessel, so that the temperature of the reaction mixture does not exceed 60° C. At the end of the addition, stirring is continued for a further ½ hour, after which the reaction mixture is neutralized with water and sodium hydrogen carbonate. After filtration and drawing off the volatile reaction products at 120° C. and 13.3 Pa, 177 g (86% of the theoretical yield) of a moderately viscous oil of formula I (according to spectroscopic data) are obtained wherein

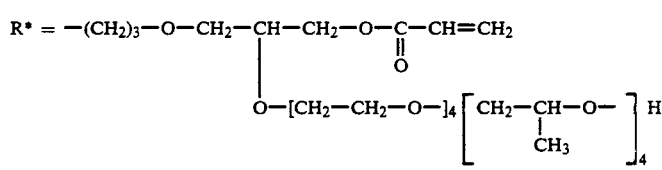

or

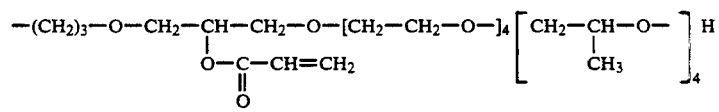

EXAMPLE 6

To a mixture of 55.9 g (0.01 moles) of a siloxane containing hydroxy groups of average formula III,

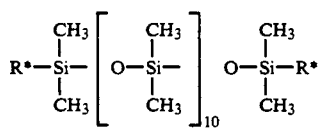

Formula I

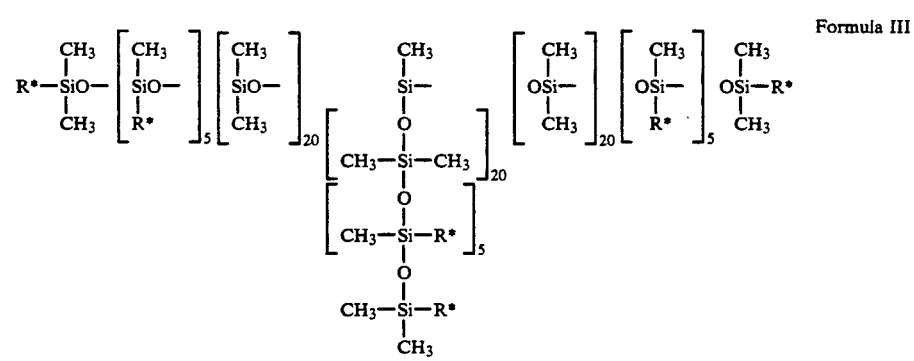

Formula III

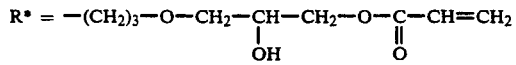

or

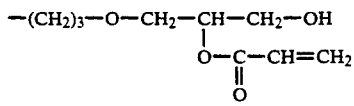

and 20 ml of toluene, 0.5 ml (1 mole percent, based on the OH groups) of boron trifluoride are added as a 48% solution in diethyl ether. Propylene oxide (41.7 g, 0.72 moles) is then added slowly in a pressure vessel, so that the temperature of the reaction mixture does not exceed 60° C. At the end of the addition, stirring is continued for a further ½ hour, after which the reaction mixture is neutralized with water and sodium hydrogen carbonate. After filtration and drawing off the volatile reaction products at 120° C. and 13.3 Pa, 89 g (91% of the theoretical yield) of a moderately viscous oil of formula III (according to spectroscopic data) are obtained with

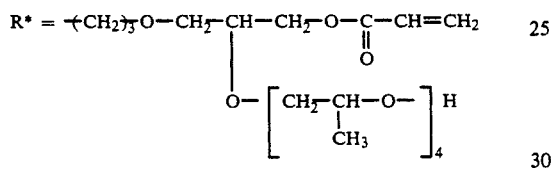

or

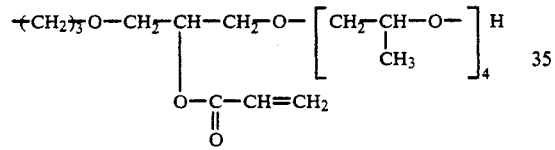

EXAMPLE 7

To a mixture of 130.6 g (0.1 moles) of a siloxane containing hydroxy groups of the average formula I, Formula I

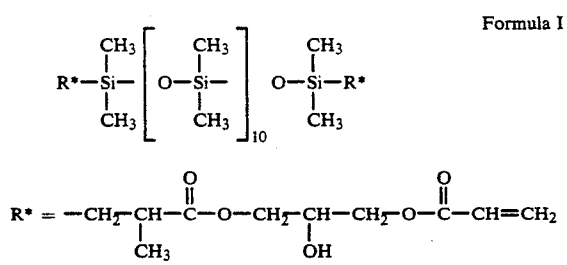

and 20 ml toluene, 0.5 ml (1 mole percent, based on the OH groups) of boron trifluoride are added as a 48% solution in diethyl ether. Allyl glycidyl ether (114 g, 1.0 moles) is then slowly added dropwise with cooling, so that the temperature of the reaction mixture does not exceed 60° C. At the end of the addition, stirring is continued for a further ½ hour, after which the reaction mixture is neutralized with water and sodium hydrogen carbonate. After filtration and drawing off the volatile reaction products at 120° C. and 0.1 torr, 221 g (91% of the theoretical yield) of a moderately viscous oil are obtained, which, according to spectroscopic data, is a silicone polyether acrylate of average formula

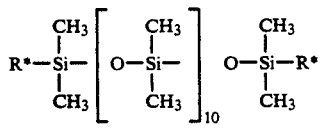

wherein R* =

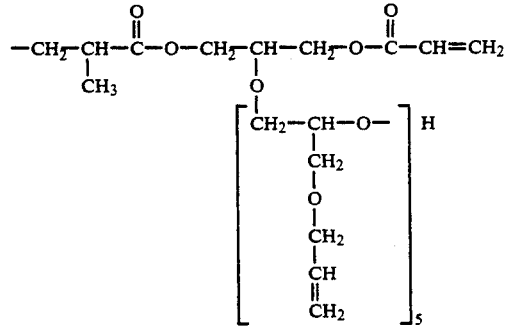

APPLICATION TESTS

To test the application properties, the silicone polyether acrylates obtained are mixed with a UV curing lacquer system in an amount of 1% by weight and the mixture is applied on bonderized steel sheet with a 40 μm wire doctor blade. The lacquer is cured three times under an 80 W/cm UV lamp at a belt speed of 12 m/min and subsequently tested for its release properties by means of a pull-off test using a Tesa 4154 tape.

TABLE 1

| Lacquer with 1% by weight of Example: | Release (N) | Scratch Test (N) | Miscibility |
|---|---|---|---|
| Lacquer without additive | 11.6 | 3.2 | |
| 1 | 6.7 | 1.9 | poor |
| 2 | 6.4 | 1.9 | poor |
| 3 | 6.4 | 2.2 | good |
| 4 | 6.9 | 1.4 | good |
| 5 | 7.0 | 1.8 | satisfactory |
| 6 | 1.2 | 0.8 | poor |
| 7 | 4.3 | 1.7 | satisfactory |

It is seen that the inventive substances impart abhesive as well as anti-scratch properties to the lacquer. The polarity of the additive and with that, also the miscibility of the lacquer formulation which is to be used can be adapted to the polarity of the lacquer system by means of the nature of the polyether groups and the ratio of the silicone chain to the polyether group.

We claim:

1. An organopolysiloxane having polyether and ester groups linked to a common spacer group, wherein the spacer group is linked to the siloxane backbone through an SiC bond and the organopolysiloxane has the formula

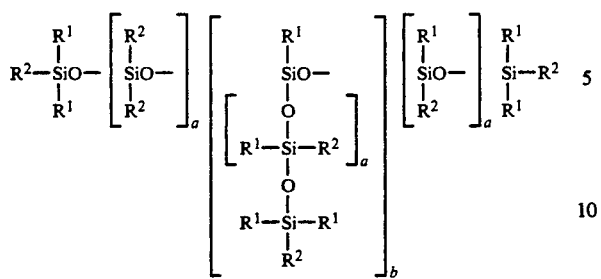

wherein
- R$^1$ groups are the same or different and in each case represent alkyl groups with 1 to 4 carbon atoms or phenyl groups, with the proviso that at least 90% of the R$^1$ groups are methyl groups,
- R$^2$ is selected from the group consisting of R$^1$ group, R$^3$—R$^4$ group, an alkyl group with 2 to 30 carbon atoms and a hydrogen group, wherein the ratio of R$^3$—R$^4$ group to the sum of alkyl group with 2 to 30 carbon atoms and hydrogen group is 70:30 to 100:0, in which
- R$^3$ is a divalent hydrocarbon group, the carbon chain of which is selected from the group consisting of a carbon chain, a carbon chain interrupted by an oxygen atom and a carbon chain with a carbonyl group and
- R$^4$ is one of the following groups:

—CH—CH$_2$O—R$^5$ group, —CH—CH$_2$O—R$^6$ group,
  |                         |
OR$^6$                  OR$^5$

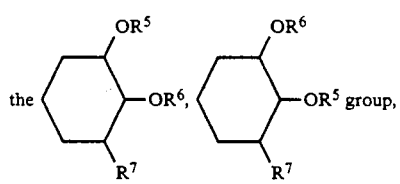

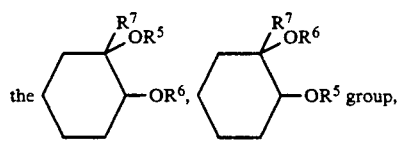

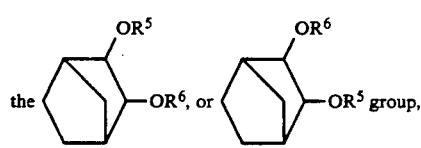

in which
- R$^5$ is the acyl group of a monocarboxylic acid with 1 to 20 carbon atoms,
- R$^6$ is a polyether group and
- R$^7$ is a hydrogen or methyl group and
- a has a value of 1 to 1,000 and
- b has a value of 0 to 10,
with the proviso that, in the average molecule, at least one R$^2$ group is a group having the formula R$^3$—R$^4$.

2. The organopolysiloxane of claim 1, in which the R$^3$ groups are selected from the group consisting of —(CH$_2$)$_c$—, —CH$_2$CH—, —(CH$_2$)$_3$OCH$_2$—,
                |
              CH$_3$ —CH$_2$CHCH$_2$OCH$_2$— and —CH$_2$CH—COCH$_2$—
    |                     |   ||
   CH$_3$                  CH$_3$ O wherein c is a number from 1 to 6.

3. The organopolysiloxane of claim 1, in which the R$^5$ group is the acyl group of an unsaturated monocarboxylic acid.

4. The organopolysiloxane of claim 3, in which the R$^5$ group is the acyl group of acrylic or methacrylic acid.

5. The organopolysiloxane of claim 1 in which the R$^6$ group is a polyether group of the formula —(C$_n$H$_{2n}$O—)$_m$H, wherein n has an average value of 2.0 to 4.0 and m has an average value of 2 to 100.

6. The organopolysiloxane of claim 5, in which n has an average value of 2.0 to 3.0.

7. The organopolysiloxane of claim 1 in which all the R$^2$ groups represent the R$^3$—R$^4$ group.

8. A method for the synthesis of an organopolysiloxane of claim 1 comprising carrying out an addition reaction of a starting organopolysiloxane with alkylene oxide, said starting organopolysiloxane having the formula

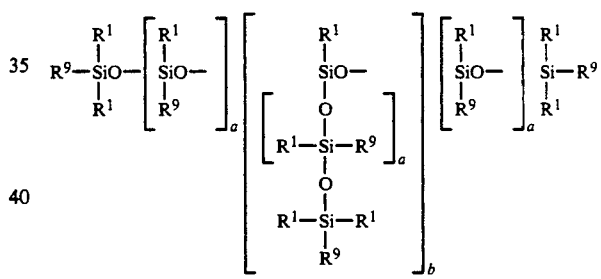

wherein
- R$^1$ groups and the subscripts a and b have the meaning given in claim 1,
- R$^9$ is selected from the group consisting of R$^1$ group, R$^3$—R$^{10}$ group an alkyl group with 2 to 30 carbon atoms and a hydrogen group, wherein the ratio of R$^3$—R$^{10}$ group to the sum of alkyl group with 2 to 30 carbon atoms and hydrogen group is 70:30 to 100:0, in which
- R$^3$ has the meaning given in claim 1 and
- R$^{10}$ represents one of the following groups:

—CH—CH$_2$O—R$^5$ group, —CH—CH$_2$O—H,
  |                       |
OH                  OR$^5$

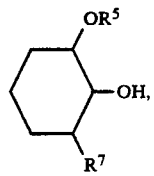 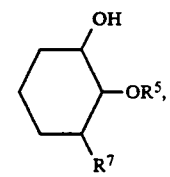

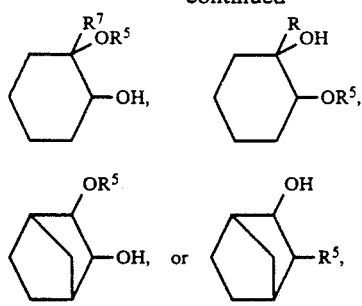

in which
R⁵, R⁶, and R⁷ have the meaning given in claim 1 with the proviso that at least one $R^2$ group in the average molecule is a group of the formula $R^3$—$R^{10}$, and wherein the addition reaction is carried out with 2 to 100 moles of allylene oxides with 2 to 4 carbon atoms individually or in admixture, based on the $R^3$—$R^{10}$ groups, in the presence of an acidic catalyst or complex catalyst which accelerates the addition reaction between alkylene oxide and hydroxyl groups, optionally in the presence of a solvent.

9. The method of claim 8, in which the addition reaction is carried out individually with ethylene oxide and/or propylene oxide to form a block copolymer or with a mixture of these oxides to form a random copolymer.

10. The method of claim 8 in which $BF_3$ is used as catalyst.

11. An additive useful for improving the characteristics of plastic, lacquer and binder compositions comprising an organopolysiloxane of claim 1.

12. An additive useful for improving the abhesive and anti-scratch properties of plastic, lacquer and binder compositions comprising an organopolysiloxane of claim 1.

13. A radiation-curable lacquer comprising an organopolysiloxane of claim 4.

14. A radiation-curable coating composition comprising an organopolysiloxane of claim 4.

* * * * *